(12) United States Patent
Chan et al.

(10) Patent No.: US 6,938,110 B2
(45) Date of Patent: Aug. 30, 2005

(54) VIRTUAL PROCESSOR THROUGH USB

(75) Inventors: Yung-Ta Chan, Hsinchu (TW);
Chi-Hsiang Wang, Hsinchu (TW);
Chao-Jang Lee, Hsinchu (TW);
Ming-Hui Su, Hsinchu (TW);
Ming-Feng Lee, Hsinchu (TW);
Hsien-Ta Tai, Hainchu (TW)

(73) Assignee: Asix Electronics Corp., Hsinchu (TW)

( * ) Notice: Subject to any disclaimer, the term of this patent is extended or adjusted under 35 U.S.C. 154(b) by 351 days.

(21) Appl. No.: 10/251,969

(22) Filed: Sep. 23, 2002

(65) Prior Publication Data

US 2004/0059861 A1 Mar. 25, 2004

(51) Int. Cl.[7] .................. G06F 13/00; G06F 13/10
(52) U.S. Cl. .................. 710/100; 710/5; 710/305; 710/313
(58) Field of Search .................. 710/5, 100, 305, 710/313, 1, 8, 15, 12, 36, 62

(56) References Cited

U.S. PATENT DOCUMENTS

| | | | | |
|---|---|---|---|---|
| 4,958,064 A | * | 9/1990 | Kirkpatrick | 235/384 |
| 5,004,937 A | * | 4/1991 | de Oliveira et al. | 326/86 |
| 6,044,428 A | * | 3/2000 | Rayabhari | 710/305 |
| 6,567,875 B1 | * | 5/2003 | Williams et al. | 710/302 |
| 6,609,179 B1 | * | 8/2003 | Takinosawa | 711/152 |
| 6,745,264 B1 | * | 6/2004 | Luke et al. | 710/52 |
| 2001/0005211 A1 | * | 6/2001 | Minowa | 347/37 |
| 2002/0011516 A1 | * | 1/2002 | Lee | 235/380 |
| 2003/0056036 A1 | * | 3/2003 | Carlton | 710/15 |

FOREIGN PATENT DOCUMENTS

JP 2001177601 A * 6/2001 .......... H04L/29/10

OTHER PUBLICATIONS

Compaq et al.; "Universal Serial Bus Specification"; Apr. 27, 2000; Revision 2.0; pp. 120,206,280,315–316.*

* cited by examiner

Primary Examiner—Paul R. Myers
Assistant Examiner—Ryan M. Stiglic
(74) Attorney, Agent, or Firm—Bacon & Thomas, PLLC

(57) ABSTRACT

The invention relates to a virtual processor through USB (VPTU), which is installed in a peripheral with USB interface specifications and comprises an I/O instruction decoding unit for decoding or compiling received and compiled instructions of USB packets for parsing the instructions and converting the same into instructions identifiable by an application chipset of the peripheral or a CPU of a computer in order to eliminate microprocessors and memory devices of a conventional peripheral complied with the USB interface specifications and perform operations involved in the transmission or receiving of the USB packets and storing USB interface programs and intermediate data created in the operations.

6 Claims, 6 Drawing Sheets

VIRTUAL PROCESSOR THROUGH USB

FIELD OF THE INVENTION

The present invention relates to universal serial bus (USB) and more particularly to a virtual processor through USB with improved characteristics.

BACKGROUND OF THE INVENTION

Various peripherals such as printers, scanners, card readers, camcoders, network hubs, digital cameras, etc. have been commercially available as information technology has known a rapid, spectacular development in recent years. Such peripherals not only increase performance of computer but also enable a user to perform tasks that are not possible in the past by utilizing the computer and the associated peripherals. For instance, video conference through the Internet, editing digital images taken by a digital camera or camcoder, or the like is effected. This can greatly increase convenience and popularity of information products among consumers. However, installations of the peripherals can cause trouble to a user. Typically, a computer must be shut down prior to installing a desired peripheral in the computer. Next, connect the peripheral to an input/output (I/O) port at a rear of the computer. Then turn on the computer to install an associated driver. After installation, reset the computer to activate the peripheral for operating in cooperating with the computer. In view of this, its installation process is tedious. Further, a Plug and Play feature is not available. Also, a few I/O ports of the computer limits the number of peripherals that can be coupled to the computer. As a result, a performance of computer cannot increase as expected.

For solving this problem, seven major computer and/or telecommunication companies developed a rule of USB interface specifications recently. It is envisaged that faster signal transmission rate, Plug and Play (i.e., more convenient), and enhanced expansion capability of electronic products can be carried out by the rule of USB interface specifications. In general, a computer complied with the USB interface specifications can only provide two USB ports each capable of coupling to 127 peripherals via an external USB hub. Moreover, it is allowed to add or delete any peripheral depending on applications. Further, no driver installation or repeated resetting of computer is required. Hence, an installation process of peripheral becomes more user friendly.

For instance, an electronic product complied with the USB interface specifications is shown as a USB hub 11 in FIG. 1. The USB hub 11 is coupled to a USB port of a computer 10. A plurality of USB ports on the USB hub 11 are coupled to a modem 120, a CD-ROM 121 both complied with the USB interface specifications, and another USB hub 13. Also, a printer 140, a facsimile machine 141, a scanner 142, and a mouse 143 all complied with the USB interface specifications are coupled to the USB hub 13. In this manner, up to 127 peripherals can be coupled to the computer 10.

Typically, a peripheral 20 complied with the USB interface specifications coupled to the computer 10 is shown in FIG. 2. The peripheral 20 comprises a USB device controller 21, a microprocessor 22, an application chipset 23 of the peripheral, a plurality of memory devices (e.g., static random access memories (SRAMs) 24, flash random access memories (FLASH RAMs) 25, etc.), and other required electronic devices and circuitry (not shown). The USB device controller 21 acts to transmit or receive USB packets between the computer 10 and the peripheral 20. The microprocessor 22 acts to perform operations on the USB packets during transmission or receiving. The application chipset 23 of peripheral acts to control the peripheral 20 in response to instructions in the packets sent from the computer 10. As a result, a task assigned by the computer 10 can be achieved or alternatively a response packet generated to send back to the computer 10. The memory devices (e.g., SRAMs 24) act to store USB interface programs. Further, other memory devices (e.g., flash RAMs 25) act to store intermediate data created in the operations. Hence, respective peripherals can operate independently for achieving tasks assigned by the computer.

A latest CPU of computer can have a processing speed up to 1 Giga Hz. Also, a RAM installed in the computer is typically about 128 MB. This is sufficient to perform operations about running programs and software packages in a typical usage. Further, a multiprocessing can be performed with respect to different programs and software packages. Hence, a modern computer is very powerful indeed. However, as stated above, a maximum performance of a modern computer has not been completely demonstrated. Typically, only up to 20% of available features of computer is achieved. This is a waste. Thus, it is desirable to fully utilize available features of CPU and memory devices of computer for replacing microprocessors and memory devices of conventional peripheral with the same so as to obtain the following benefits; Perform operations involved in the transmission or receiving of the USB packets. Store USB interface programs and intermediate data created in the operations. Eliminate microprocessors and memory devices of a conventional peripheral that complies with the USB interface specifications. Reduce a burden on consumers in purchasing the peripherals.

Thus, it is desirable to provide a virtual processor through USB in order to overcome the above drawbacks of the prior art such as not fully utilization of available features of CPU and memory devices of computer.

SUMMARY OF THE INVENTION

The invention relates to a virtual processor through USB (VPTU) for performing operations involved in the transmission or receiving of the USB packets and storing USB interface programs and intermediate data created in the operations. The invention installs the VPTU in a peripheral for eliminating microprocessors and memory devices of a conventional peripheral complied with the USB interface specifications. By utilizing the invention, it is possible of greatly reducing a manufacturing cost of the peripherals complied with the USB interface specifications and reducing a burden on consumers in purchasing the peripherals.

A primary object of the present invention is to provide a VPTU comprising an I/O instruction decoding unit for decoding or compiling received and compiled instructions of USB packets for parsing the instructions and converting the same into instructions identifiable by an application chipset of the peripheral or a CPU of a computer. Therefore, microprocessors of a conventional peripheral complied with the USB interface specifications can be replaced by the invention.

Another object of the present invention is to provide a VPTU comprising a data queuing and storing unit for processing received data of the USB packets to be transmitted so that data of the USB packets are capable of being transmitted to the peripheral or the computer for storage in a first in first out (FIFO) queuing process. Therefore, memory devices of the conventional peripheral complied with the USB interface specifications can be replaced by the invention.

Still another object of the present invention is to provide a VPTU comprising a processor interrupt control unit coupled to the peripheral for receiving interrupt signals sent therefrom. The processor interrupt control unit can command the data queuing and storing unit to store data being transmitted or received in a queue in response to the receiving of the interrupt signals and perform the unfinished queue and the storage process in response to an ending of the interrupt signals.

The above and other objects, features and advantages of the present invention will become apparent from the following detailed description taken with the accompanying drawings.

DETAILED DESCRIPTI/ON OF THE PREFERRED EMBODIMENTS

Figure 1:
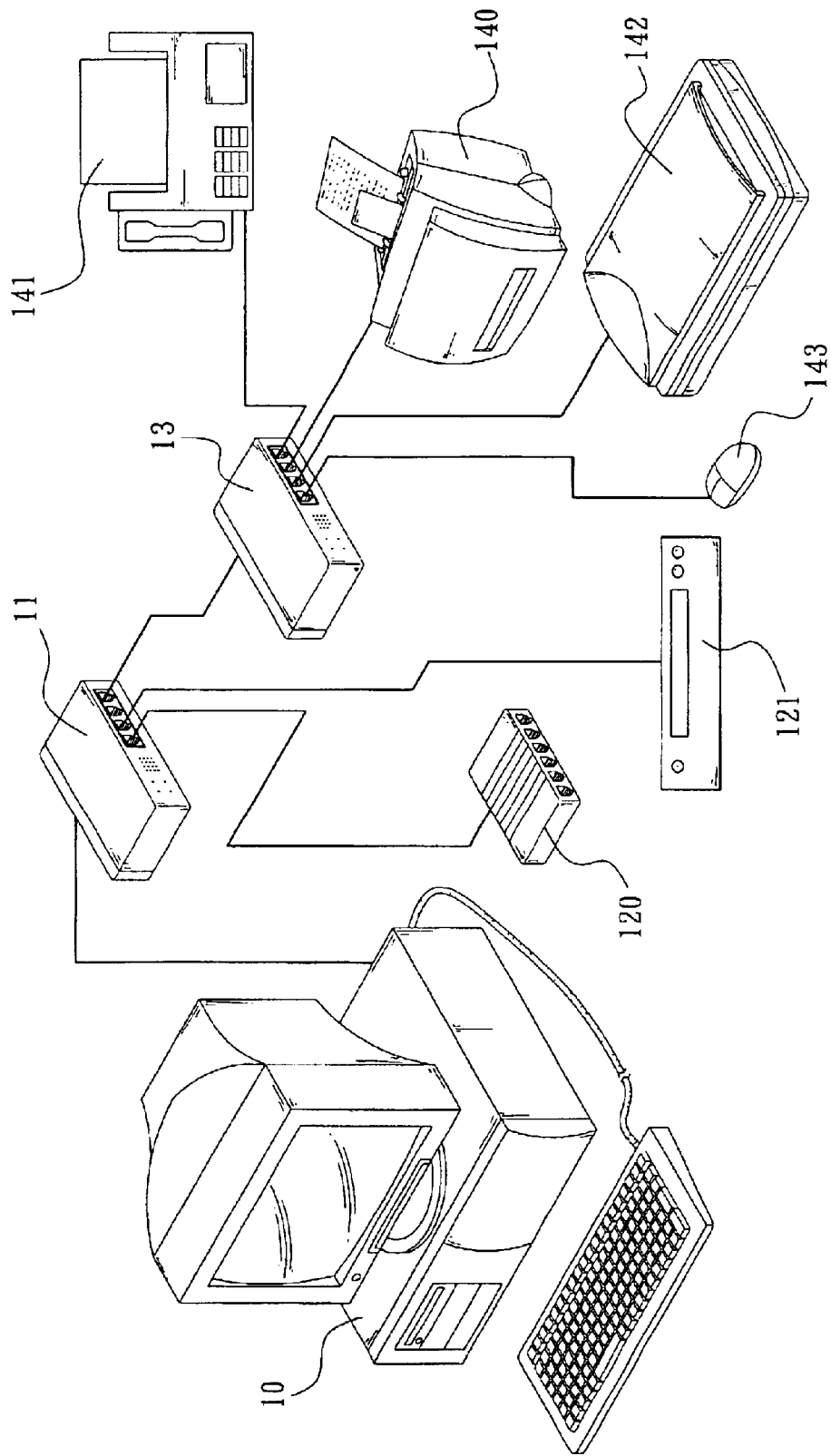
FIG. 1 presents schematically the connection of a conventional peripheral complied with the USB interface specifications to a computer.
Figure 2:
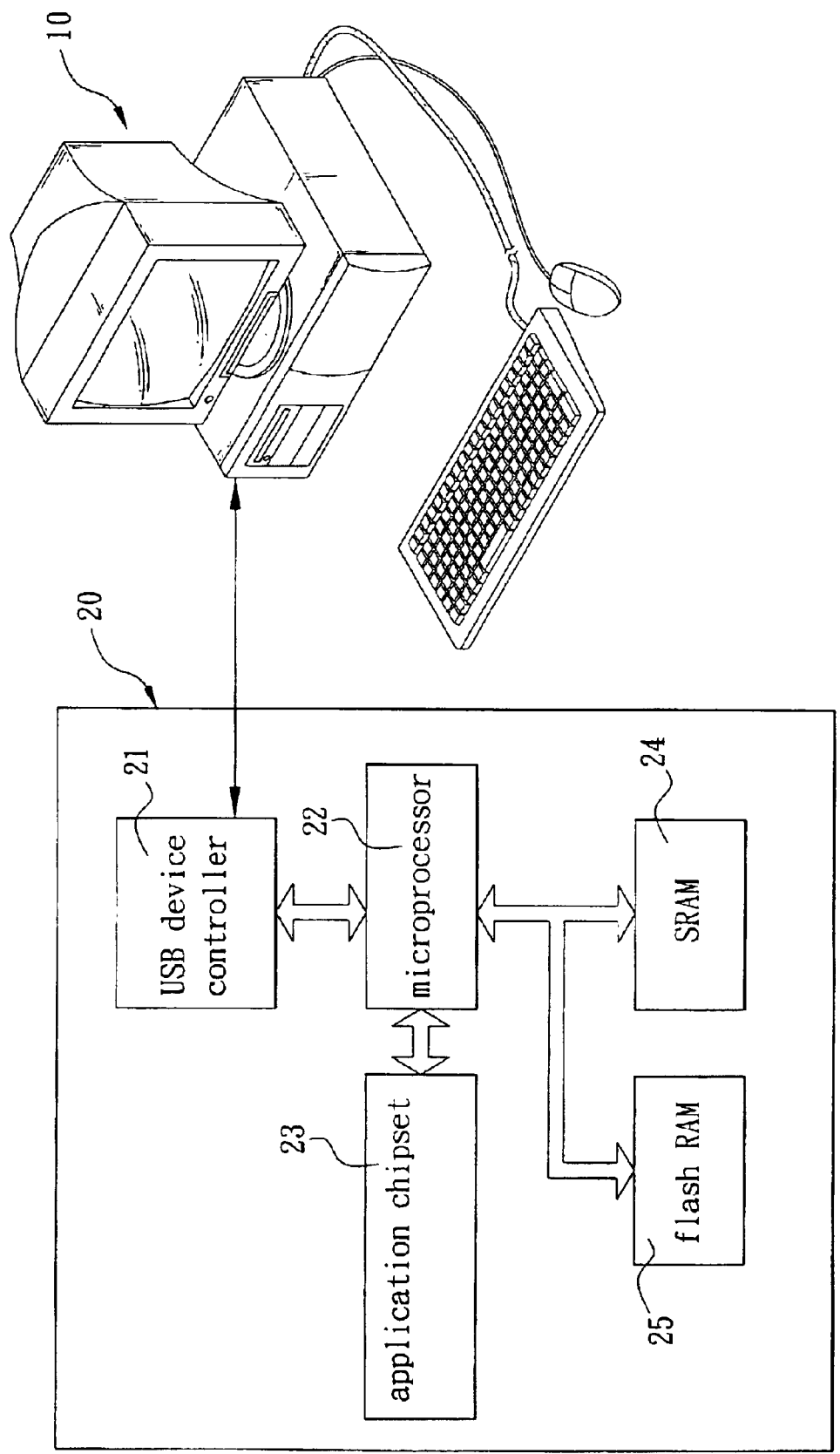
FIG. 2 is a block diagram of a conventional peripheral complied with the USB interface specifications where the peripheral is coupled to the computer.
Figure 3:
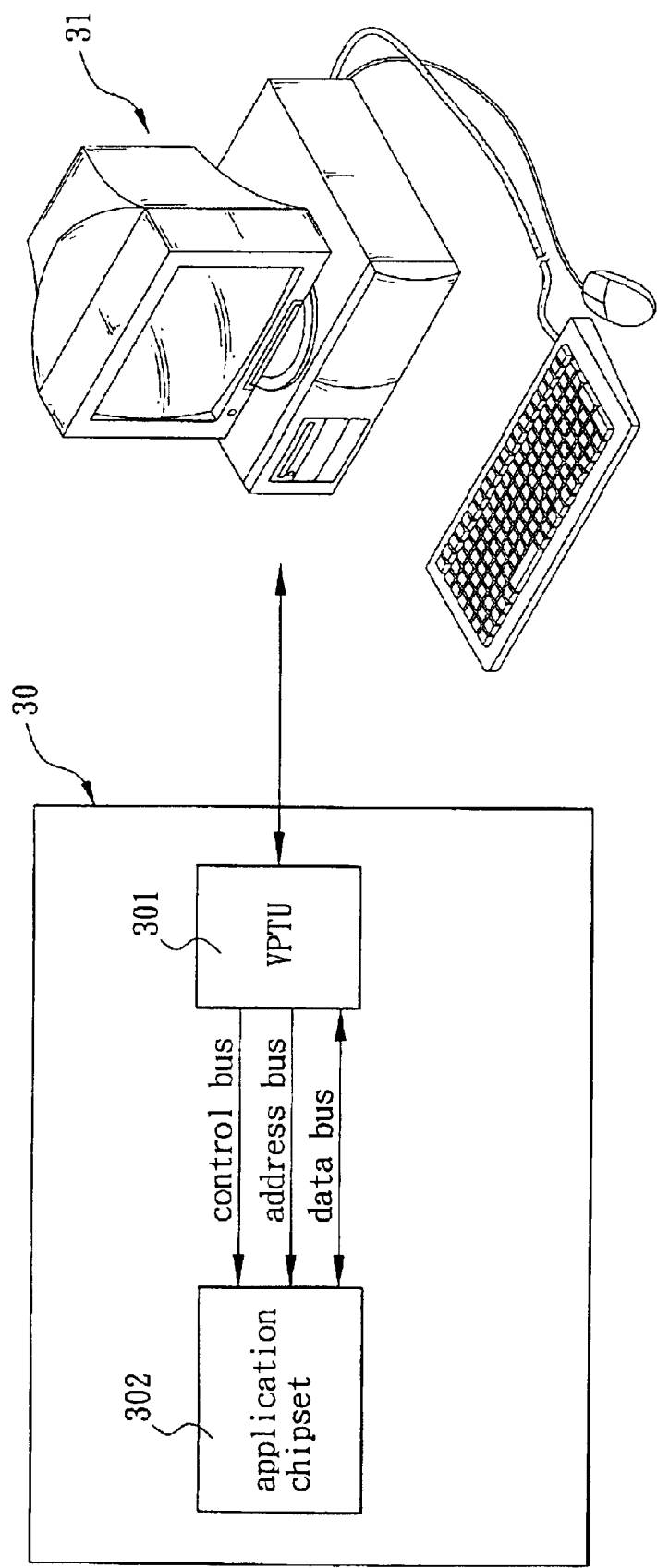
FIG. 3 presents schematically the connection of a virtual processors through USB to a computer according to a preferred embodiment of the invention.

The invention is directed to a virtual processor through USB (VPTU). Referring to FIG. 3, the VPTU 301 is installed in a peripheral 30 complied with the USB interface specifications. Control bus, address bus, and data bus are interconnected the VPTU 301 and an application chipset 302 of the peripheral 30. The control bus, address bus, and data bus are utilized to replace microprocessors and memory devices of a conventional peripheral complied with the USB interface specifications. When the peripheral 30 is coupled to a computer 31 through a USB port thereof, the VPTU 301 can command a CPU of the computer 31 through the USB port. Next, the CPU performs operations on USB packets in a process of transmitting or receiving the USB packets. Also, memory devices of the computer 31 act to store USB interface programs and intermediate data created in the operations for controlling the application chipset 302 of peripheral. The application chipset 302 of peripheral is thus commanded to perform tasks assigned by instruction packets sent from the computer 31, or alternatively generate a response packet to send back to the computer 31.

Figure 4:
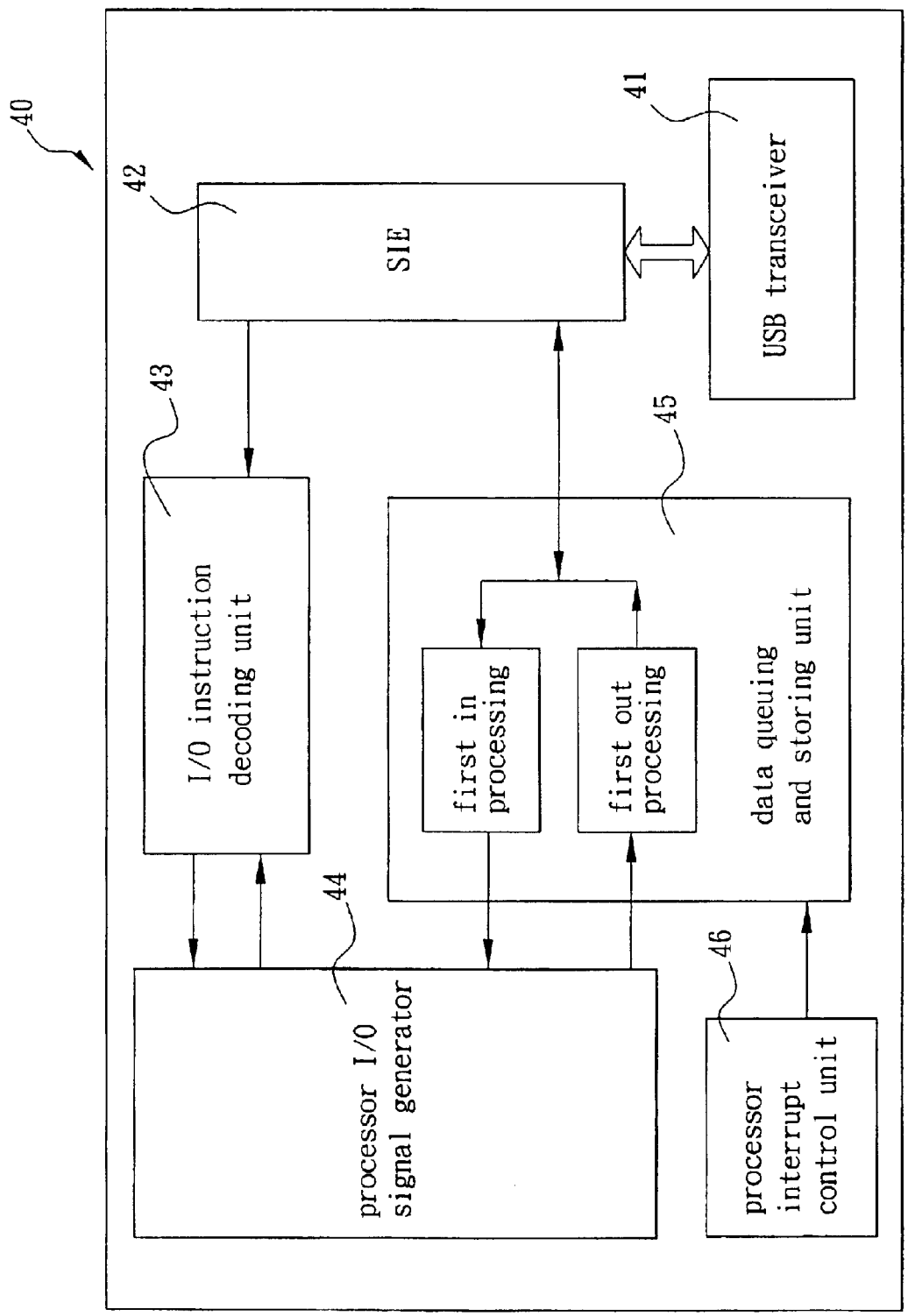
FIG. 4 is a block diagram of the virtual processors through USB according to the invention.

Referring to FIG. 4, there is shown a preferred embodiment of VPTU 40 according to the invention. The VPTU 40 comprises a USB transceiver 41, a serial interface engine (SIE) 42, an I/O instruction decoding unit 43, an address processor I/O signal generator 44, a data queuing and storing unit 45, and a processor interrupt control unit 46. The USB transceiver 41 and the SIE 42 are required components of a well known peripheral complied with the USB interface specifications. The USB transceiver 41 acts to receive the USB packets sent from the computer, or alternatively send back the packets generated by the VPTU 40 to the computer. The SIE 42 acts to compile the USB packets in the USB transceiver 41 received from the computer or the USB packets generated by the VPTU 40. Hence, the USB packets (including instruction and data packets) to be transmitted or the received ones can be converted into signals to be sequentially transmitted through a single channel.

Referring to FIG. 4 again, in the VPTU 40 the I/O instruction decoding unit 43 and the data queuing and storing unit 45 act to process instructions and data of the USB packets which have been received and compiled in the SIE 42, or process instructions and data in the USB packets to be transmitted. The I/O instruction decoding unit 43 acts to decode or compile instructions of the USB packets to be received or transmitted for parsing the instructions and converting the same into instructions identifiable by the application chipset of peripheral or the CPU of computer. The data queuing and storing unit 45 acts to process data of the USB packets to be received or transmitted. As a result, the packets can be transmitted to the peripheral or the computer for storage in a first in first out (FIFO) queuing process.

Referring to FIG. 4 again, the VPTU 40 are coupled to the application chipset thereof through the processor I/O signal generator 44 and the processor interrupt control unit 46. The processor I/O signal generator 44 acts to compile the decoded instructions in the I/O instruction decoding unit 43 and data sent from the data queuing and storing unit 45 into local bus signals to be received by the peripheral. The processor interrupt control unit 46 acts to transmit interrupt signals sent from the peripheral to the data queuing and storing unit 45. In response, the data queuing and storing unit 45 stores the received interrupt signals in a data packet to be transmitted or received in a queue. Once the interrupt signals are ended, perform the unfinished queue and the storage process.

In view of the above, the invention installs the VPTU in the peripheral complied with the USB interface specifications for replacing microprocessors and memory devices of the conventional peripheral complied with the USB interface specifications. Thus, in the process of transmitting or receiving the USB packets the CPU and the memory devices of computer act to perform operations, store USB interface programs, and store intermediate data created in the operations in lieu of the microprocessors and memory devices of the conventional peripheral complied with the USB interface specifications. Hence, the invention has to install associated USB interface programs and decoding/encoding programs in the memory devices of the computer in response to the installation of the VPTU in the peripheral. When the computer is powered on, the CPU of the computer can control the application chipset of peripheral via the VPTU based on operation logic and control procedure of programs. As an end, the peripheral can perform tasks assigned by instructions sent from the computer, or alternatively generate a response packet to send back to the computer.

Referring to FIG. 4 again, in the invention the computer, the VPTU 40, and the peripheral act to perform the following processes based on operation logic and control procedure programmed by the USB interface programs and the decoding/encoding programs:

1. First, the computer generates associated setup token and data and creates a USB packet in response to an instruction to be executed (e.g., an instruction about reading, writing, continuous writing, direct memory access (DMA) conversion, interrupt signals or status reply). Also, the USB packet is sent to the VPTU 40.

2. Next, the USB transceiver 41 and the SIE 42 of the VPTU 40 receive the USB packet and process the same. The processed USB packet is then sent to the I/O instruction decoding unit 43 for parsing. As meaning of instruction contained in the USB packet is understood, a handshake of acknowledgement is created and sent back to the computer. At the same time, the parsed instruction is sent to the processor I/O signal generator 44 for compiling into local bus signals to be received by the peripheral.

3. The peripheral performs tasks assigned by the instruction of computer in response to a receiving of the local bus signals.

In view of the above processing steps in the embodiment of the invention if the CPU of computer is a 16 bit processor the computer will perform the following steps as the peripheral is executing a writing operation:

1. First, the computer generates and outputs a written setup token. Also, a data frame to be outputted is defined as 40 30 55 AA 00 00 00 00 where 40 means that this field defines a vender command of host-to-device complied with USB standard, i.e., the CPU of computer will perform a writing on the peripheral;

30 means that this field defines an address, i.e., the CPU of computer will perform a writing on the peripheral at the address;

55 means that this field defines low bytes of data;

AA means that this field defines high bytes of data, i.e., AA55 are data to be written into the peripheral by the CPU of computer;

00 00 means that this field is null; and 00 00 means that this field defines a single or multiple writing in which zero means a single writing.

Figure 5:
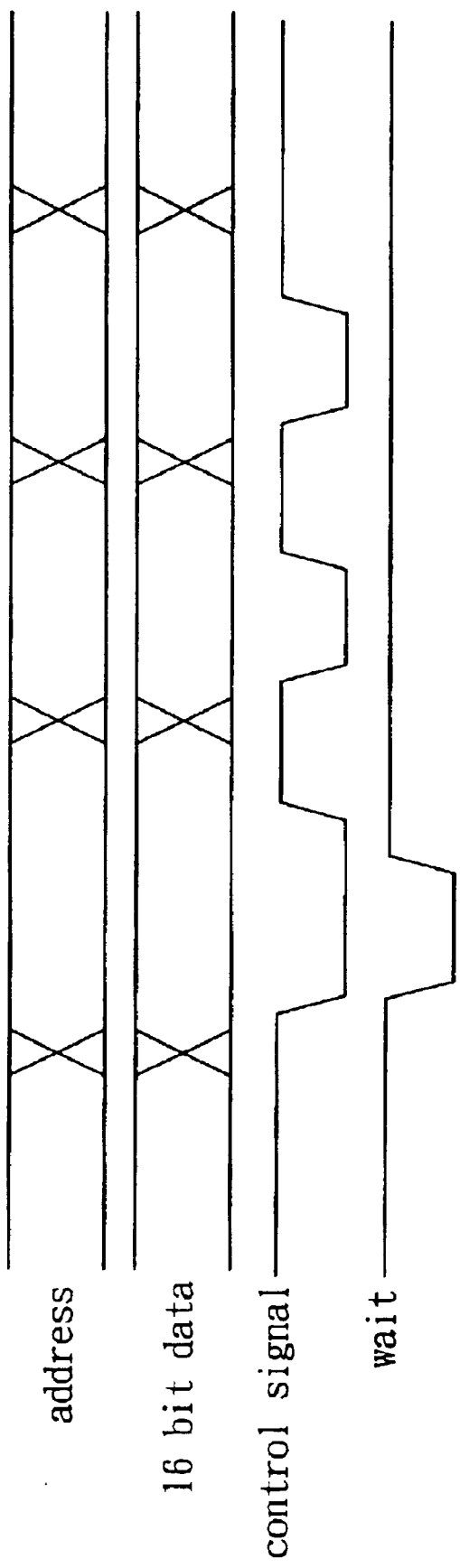
FIG. 5 is a waveform diagram illustrating control signal sent from the computer to the peripheral as the computer is performing a writing on the peripheral according to the preferred embodiment of the invention.

2. In response to a receiving of setup token and data by the VPTU 40, the I/O instruction decoding unit 43 acts to parse the same. As meaning of instruction contained in the USB packet is understood, a handshake of acknowledgement is created and sent back to the computer. Also, the parsed instruction is sent to the processor I/O signal generator 44 for compiling into local bus signals to be received by the peripheral. Further, control signals as shown in the waveform of FIG. 5 are sent to the peripheral.

In the previous embodiment, the computer will perform the following steps as the peripheral is executing continuous writing operations:

1. First, the computer generates and outputs a continuous written setup token. Also, a data frame to be outputted is defined as 40 30 55 AA 00 00 08 00 where 40 means that this field defines a vender command of host-to-device complied with USB standard, i.e., the CPU of computer will perform a writing on the peripheral;

30 means that this field defines an address, i.e., the CPU of computer will perform a writing on the peripheral at the address;

55 means that this field defines low bytes of data;

AA means that this field defines high bytes of data, i.e., AA55 are data to be written into the peripheral by the CPU of computer;

00 00 means that this field is null; and 08 00 means that this field defines a single or multiple writing in which eight means two writings and so on.

Figure 6:
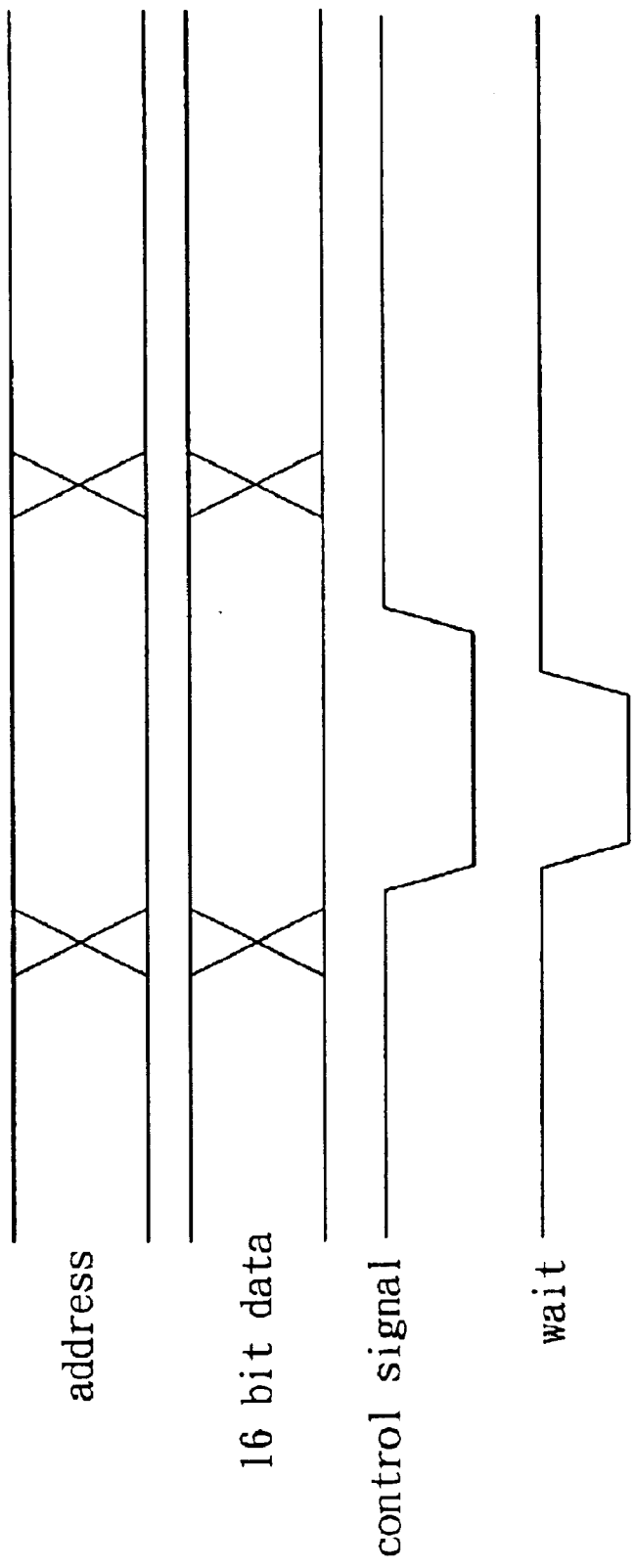
FIG. 6 is a waveform diagram illustrating control signal sent from the computer to the peripheral as the computer is performing a continuous writing on the peripheral according to the preferred embodiment of the invention.

2. In response to a receiving of setup token and data by the VPTU 40, the I/O instruction decoding unit 43 acts to parse the same. As meaning of instruction contained in the USB packet is understood, a handshake of acknowledgement is created and sent back to the computer. Also, the parsed instruction is sent to the processor I/O signal generator 44 for compiling into local bus signals to be received by the peripheral. Further, control signals as shown in the waveform of FIG. 6 are sent to the peripheral.

3. In response to a receiving of the handshake of acknowledgement by the computer, an out token is generated and outputted. Also, a data frame to be outputted is defined as 31 00 BB AA 32 00 CC DD where 31 means that this field defines an address, i.e., the CPU of computer will perform a first writing on the peripheral at the address;

00 means that this field is reserved;

BB means that this field defines low bytes of data;

AA means that this field defines high bytes of data, i.e., AABB are data to be first written into the peripheral by the CPU of computer;

32 means that this field defines another address, i.e., the CPU of computer will perform a second writing on the peripheral at the address;

00 means that this field is reserved;

DD means that this field defines low bytes of data; and

CC means that this field defines high bytes of data, i.e., CCDD are data to be second written into the peripheral by the CPU of computer.

4. In response to a receiving of out token and data by the VPTU 40, the I/O instruction decoding unit 43 acts to parse the same. As meaning of instruction contained in the USB packet is understood, a handshake of acknowledgement is created and sent back to the computer. Also, the parsed instruction is sent to the processor I/O signal generator 44 for compiling into local bus signals to be received by the peripheral. Further, control signals as shown in the waveform of FIG. 6 are sent to the peripheral.

It is understood that the VPTU 40 of the invention may issue different control signals (i.e., different waveforms) to the peripheral in response to different instructions issued by the CPU of computer (e.g., an instruction about reading, writing, continuous writing, DMA conversion, interrupt signals or status reply). Also, the control signals may be differed depending on applications or based on operation logic and control procedure programmed by the USB interface programs and the decoding/encoding programs. However, the control signals, the USB interface programs, and the decoding/encoding programs are not subject of the invention. Thus a detailed description thereof is omitted herein for the sake of brevity.

In brief, the VPTU of the invention is applicable to a peripheral complied with the USB interface specifications. Also, such VPTU is cost effective and simple in circuitry. Once the VPTU is incorporated in the peripheral complied with the USB interface specifications, the CPU of a conventional computer can directly transmit USB packets to the peripheral or receive the USB packets from the peripheral. Further, operations are performed on the USB packets. Hence, memory devices of the conventional computer can store USB interface programs and intermediate data created in the operations. As a result, a number of benefits are obtained. For instance, expensive, complicated microprocessors and memory devices of the conventional peripheral are replaced by the VPTU of the invention, a manufacturing cost of the peripherals complied with the USB interface specifications is greatly reduced. Finally, a burden on consumers in purchasing the peripherals is greatly reduced.

While the invention has been described by means of specific embodiments, numerous modifications and variations could be made thereto by those skilled in the art without departing from the scope and spirit of the invention set forth in the claims.

What is claimed is:

1. A virtual processor though USB (VPTU) provided in a peripheral that complies with USB interface specifications, the peripheral including a control bus, an address bus, a data bus, and an application chipset coupled to the VPTU via the control bus, the address bus, and the data bus, wherein when the peripheral is coupled to a computer through a USB port thereof, the VPTU is operative to command a CPU of the computer to perform operations on USB packets in a process of transmitting or receiving the USB packets through the USB port, at least one memory device of the computer is operative to store USB interface programs and intermediate data created in the operations for controlling the application chipset, and the application chipset is commanded to perform tasks assigned by instruction packets set from the computer or to generate a response packet to send back to the computer.

2. The VPTU of claim 1, further comprising:
 a USB transceiver for receiving the USB packets sent from the computer or sending back the USB packets generated by the VPTU to the computer; and
 a serial interface engine (SIE) for comprising the USB packets in the USB transceiver received from the computer of the USB packets generated by the VPTU so that the USB packets to be transmitted or the received USB packets are capable of being converted into signals to be sequentially transmitted through a single channel.

3. The VPTU of claim 2, further comprising an I/O instruction decoding unit for decoding or compiling instructions of the USB packets received and compiled by the SIE or the instructions of the USB packets to be transmitted for parsing the instructions and converting the same into instructions identifiable by the application chipset or the CPU of the computer.

4. The VPTU of claim 3, further comprising a data queuing and storing unit for processing data of the USB packets received and compiled by the SIE or the instructions of the USB packets to be transmitted so that the USB packets are capable of being transmitted to the peripheral or the computer for storage in a first in first out (FIFO) queuing process.

5. The VPTU of claim 4, further comprising a processor I/O signal generator coupled to the application chipset for compiling the decoded instructions in the I/O instruction decoding unit and data set from the data queuing and storing unit into local bus signals to be received by the peripheral.

6. The VPTU of claim 4, further comprising a processor interrupt control unit coupled to the data queuing and storing unit, the data queuing and storing unit receiving interrupt signals sent from the processor interrupt control, and the processor interrupt control unit being operative to command the data queuing and storing unit to store data being transmitted or received in a queue in response to the receiving of the interrupt signals, and to perform processing of the unfinished queue and the storage in response to an ending of the interrupt signals.

* * * * *